United States Patent
Martinelli et al.

(10) Patent No.: US 8,902,758 B2
(45) Date of Patent: Dec. 2, 2014

(54) LIGHT PATH PRIORITY IN DENSE WAVELENGTH DIVISION MULTIPLEXED NETWORKS

(75) Inventors: Giovanni Martinelli, Lombardia (IT); Moustafa Kattan, Dubayy (AE); David Bianchi, Cambiago (IT); Ornan Gerstel, Herzliya (IL)

(73) Assignee: Cisco Technology, Inc., San Jose, CA (US)

( * ) Notice: Subject to any disclaimer, the term of this patent is extended or adjusted under 35 U.S.C. 154(b) by 244 days.

(21) Appl. No.: 13/150,333

(22) Filed: Jun. 1, 2011

(65) Prior Publication Data
US 2012/0308231 A1 Dec. 6, 2012

(51) Int. Cl.
*H04B 10/07* (2013.01)
*H04J 14/02* (2006.01)
(52) U.S. Cl.
CPC ......... *H04J 14/0268* (2013.01); *H04J 14/0257* (2013.01)
USPC ............................................ 370/238; 398/19
(58) Field of Classification Search
USPC ............ 370/221–253; 398/43–45, 37, 47, 58, 398/79, 83, 1–24
See application file for complete search history.

(56) References Cited

U.S. PATENT DOCUMENTS

| | | | |
|---|---|---|---|
| 6,496,476 B1 * | 12/2002 | Badt et al. | 370/228 |
| 6,973,229 B1 * | 12/2005 | Tzathas et al. | 385/16 |
| 7,333,438 B1 * | 2/2008 | Rabie et al. | 370/242 |
| 2002/0176131 A1 * | 11/2002 | Walters et al. | 359/118 |
| 2003/0026525 A1 * | 2/2003 | Alvarez | 385/16 |
| 2004/0136711 A1 * | 7/2004 | Finan et al. | 398/59 |
| 2004/0208578 A1 * | 10/2004 | Kinoshita et al. | 398/83 |
| 2005/0105905 A1 * | 5/2005 | Ovadia et al. | 398/47 |
| 2006/0013584 A1 * | 1/2006 | Miyazaki | 398/19 |
| 2006/0176806 A1 * | 8/2006 | Yoshihara et al. | 370/229 |
| 2007/0242625 A1 * | 10/2007 | Dunne et al. | 370/258 |
| 2007/0255640 A1 * | 11/2007 | Gumaste | 705/37 |
| 2009/0034971 A1 * | 2/2009 | Sadanada | 398/49 |

OTHER PUBLICATIONS

D. Awduche, et al., RFC 3209—RSVP-TE: Extensions to RSVP for LSP Tunnels, Network Working Group 3209, Standards Track, Dec. 2001, (62 pages).
M. Kattan, et al., WSON Wavelength Priority Information, Internet Engineering Task Force, Internet Draft, Jul. 2010, (7 pages).
Y. Lee, et al., Routing and Wavelength Assignment Information Model for Wavelength Switched Optical Networks, Network Working Group, Internet Draft, Mar. 14, 2011, (28 pages).
S. Bradner, Key Words for Use in RFCs to Indicate Requirement Levels, Network Working Group, RFC: 2119, Mar. 1997 (3 pages).

* cited by examiner

*Primary Examiner* — Andrew Chriss
*Assistant Examiner* — John Lequang
(74) *Attorney, Agent, or Firm* — Edell, Shapiro & Finnan, LLC (57) ABSTRACT

Techniques are provided for using light path priority of service information in an optical network. At a node in the optical network, priority of service information is stored for a plurality of light paths used in the optical network. The node serves traffic in the optical network using the plurality of light paths based on the priority of service information. These techniques provide for prioritizing light paths (wavelengths) for scenarios such as restoration, congestion and resource contention.

9 Claims, 6 Drawing Sheets

FIG. 1

Nodes A, B, C and D Learn from Control
Plane Signaling/Advertising Light Path
Priority of Service Information:

LPs 1-4 and 5-10          Priority 1
LPs 11-19 and 20-25       Priority 2
LPs 26-40                 Priority 3

◄─────► Control Plane Signaling

LIGHT PATH PRIORITY IN DENSE WAVELENGTH DIVISION MULTIPLEXED NETWORKS

TECHNICAL FIELD

The present disclosure relates to optical networks.

BACKGROUND

In current Generalized Multiple Protocol Label Switched (GMPLS) networks, the generalized label takes on different meaning depending on the underlying network technology. In wavelength switched optical networks, the labels represent wavelengths. A light path is a specific wavelength configured between an ingress node and an egress node, following a specific path. However, there is no information available in wavelength switched optical networks about how different light paths can be assigned different priorities. Current wavelength switched optical networks are implemented with dense wavelength division multiplexed technologies, and all light paths are treated equally regardless of the type of data, bandwidth and mission criticality of the traffic carried on a light path.

DESCRIPTION OF EXAMPLE EMBODIMENTS

Overview

Techniques are provided herein for using light path priority of service information in an optical network. At a node in the optical network, priority of service information is stored for a plurality of light paths used in the optical network. The node serves traffic in the optical network using the plurality of light paths based on the priority of service information. These techniques provide for prioritizing light paths (wavelengths on specific paths) for scenarios such as restoration, congestion and resource contention.

Example Embodiments

Figure 1:
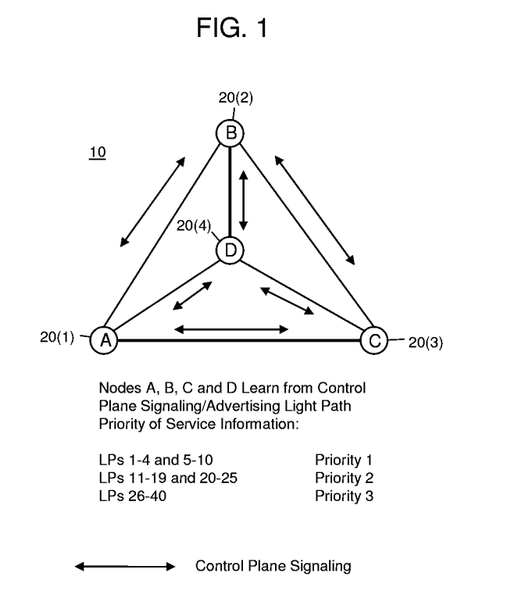
FIG. 1 is a block diagram showing an example of an optical network in which nodes are configured to use light path priority of service information when serving traffic in the optical network.

Referring first to FIG. 1, a diagram is shown depicting an example of a mesh wavelength (light path) switched optical network (WSON) 10. In this example network, there are 4 nodes: A, B, C and D, also identified by reference numerals 20(1)-20(4), respectively. A light path is a specific wavelength configured between an ingress node and an egress node. In the example of FIG. 1, there are 40 light paths (LPs) allocated, and a service level of priority is assigned to the light paths such that LPs 1-4 and 5-10 are assigned Priority 1, LPs 11-19 and 20-25 are Priority 2, and LPs 26-40 are Priority 3, where Priority 1 is a higher then Priority 2 which is higher than Priority 3. Nodes A, B, C and D learn the light path service level of priority through control plane signaling/advertising.

Within the WSON extension for Generalized Multiple Protocol Label Switched (GMPLS) protocols the generalized labels associated with Label Switched Paths (LSPs) represent the specific wavelengths in use for a light path. According to the techniques described herein, the light path priority information is provided for use within WSON control plane. The light path priority information is directly available to the optical control plane protocols (routing, signaling, etc.) to enable and support new light path management policies to implement Service Level Agreements (SLAs) at the light path level. This can be achieved by assigning a priority tag for each light path (wavelength) that could be either manually or automatically set once the light path is established. There are different encoding schemes that may be used depending on the type of protocol used to distribute information over the control plane.

Light paths can be prioritized based on variety of criteria such as bandwidth used, traffic time (Fiber Channel, Time Division Multiplexed, Internet Protocol, etc.), etc. Another application of light path based priority is to assign a priority according to an amount a customer pays under a SLA such that customers that pay higher fees under an SLA are allocated higher priority light paths. There may be additional levels of priority and the use of 3 levels as shown in FIG. 1 is only an example.

Figure 2:
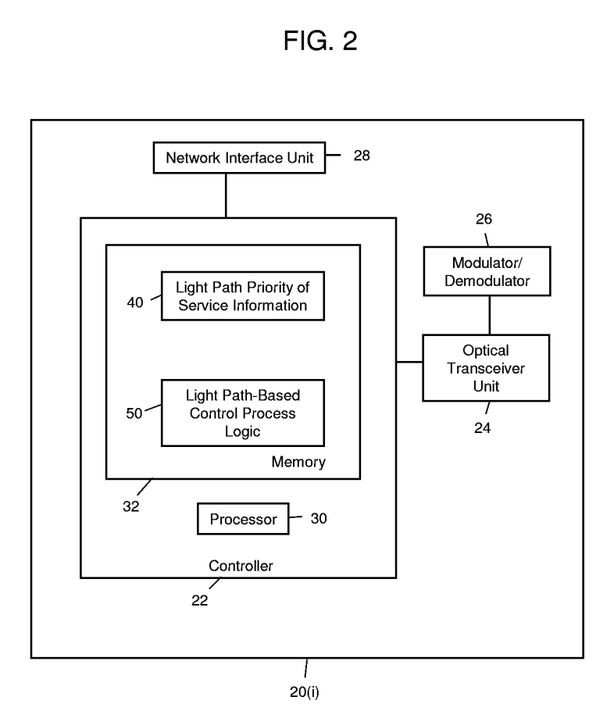
FIG. 2 is a block diagram showing an example of a node that is configured to use light path priority of service information when serving traffic in the optical network.

With reference to FIG. 2, an example of a block diagram of an optical network node, generically labeled at reference numeral 20(i), is now described. The node 20(i) comprises a controller 22, an optical transceiver unit 24, a modulator/demodulator unit 26, and a network interface unit 28. The controller 22 comprises a processor 30 and memory 32. The controller 22 serves as a main control element of the node 20(i). The optical transceiver unit 24 performs the optical transmission and optical receiving functions over optical fibers (not shown). The modulator/demodulator 26 performs the modulation of data for optical transmission and the demodulation of received optical signals, as may be needed in the node 20(i) depending on its functions in an optical network. The network interface unit 28 is, for example, an Ethernet network interface card, that enables electrical network communications over a local area or wide area network to facilitate control plane communications.

In one form, the processor 30 is a microcontroller or microprocessor that is programmed with processor executable software instructions. To this end, the memory 32 stores software instructions that are executed by the processor 30 as well as other data. For example, the memory 32 stores light path priority of service information 40 and also light path-based control process logic 50. The memory 32 is a memory device and may comprise random access memory (RAM), read only memory (ROM), flash memory devices, electrical, optical, or other physical/tangible memory storage devices. In general, the memory 32 may comprise one or more computer readable storage media (e.g., a memory device) encoded with software comprising computer executable instructions and when the software is executed (by the processor 30) it is operable to perform the operations described herein in connection with light path-based control process logic 50. In another form, the controller 22 is implemented in hardware, such as digital logic gates in an application specific integrated circuit (ASIC). Thus, the operations of the light path-based control process logic 50 may be implemented in hardware or software. Operations of the light path-based control process 50 are described hereinafter in connection with FIGS. 4-10.

Figure 3:
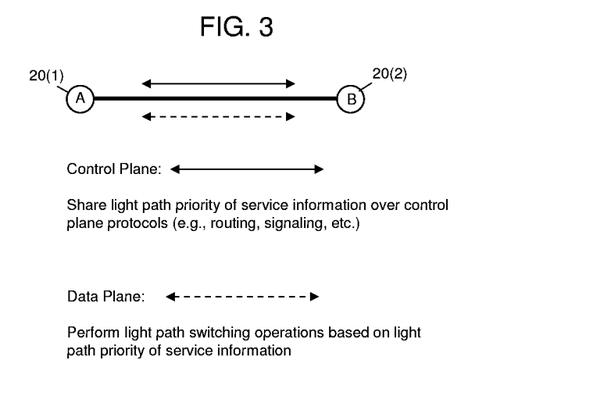
FIG. 3 is a diagram that illustrates how nodes share information about light path priority of service information over a control plane for use in serving traffic in a data plane.

Reference is now made to FIG. 3. FIG. 3 shows the control plane communication between two nodes, e.g. nodes 20(1) and 20(2) in connection with the techniques described herein. Over the control plane, the nodes share light path priority of service information with each other via a control plane protocol, e.g., a routing protocol, signaling protocol, etc. The light path priority information can be encoded by any of a variety of techniques within the control plane and in the GMPLS protocols. On the data plane, the nodes perform wavelength (light path) switching operations based on the light path priority of service information.

Figure 4:
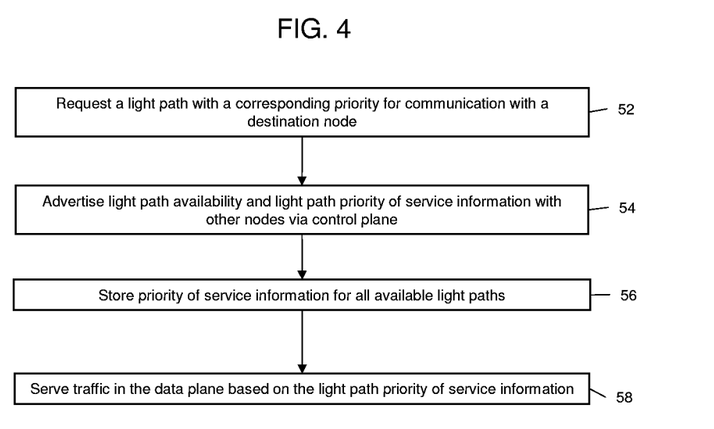
FIG. 4 illustrates a flow chart that depicts operations performed in a node that is configured to use light path priority of service information when serving traffic in the optical network.

Turning now to FIG. 4, a diagram is shown that depicts operations of the light path-based control process logic 50 in a node. FIGS. 5-10 illustrate specific scenarios and operations performed by the control process logic 50 for these scenarios.

At 52, a node requests a light path with a corresponding priority for communication with a destination node. Light paths requests sent by nodes in the network will have different source/destination information as well as light path priority level. At 54, each node in the network sends messages over the control plane to advertise to other nodes wavelength availability and light path priority of service information. At 56, each node stores priority of service information for all available light paths. At 58, wavelengths are used in the data plane for serving traffic based on the light path priority of service information. Operation 58 involves controlling the optical transceiver in a given node such that it transmits (or does not transmit) data on a particular wavelength depending on the priority of service information. Thus, at 58, a node is configured to allow a light path to be added/dropped/traverse the node based on the light path priority of service information.

Example scenarios for using the light path priority of service information are now described in connection with FIGS. 5-10.

Light Path Priority of Service Restoration

Figure 5:
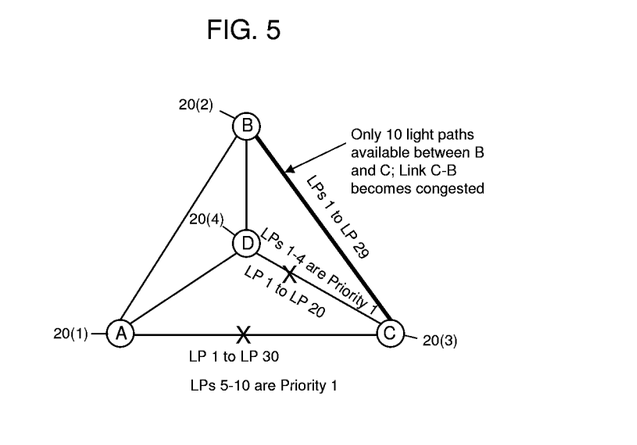
FIG. 5 is a block diagram showing an example of an optical network for using light path priority of service information in a restoration scenario.

FIG. 5 illustrates a restoration scenario in the WSON 10 from FIG. 1 in which LPs 1-30 are set up between nodes C and A and LPs 1-20 are set up between nodes D and C. LPs 1-29 are already setup between nodes B and C. Consequently, there are only 10 LPs available out of the 40.

When a failure occurs in a Dense Wavelength Division Multiplexed (DWDM) network, failed light paths are restored gradually so as to not upset any of the control loops in the network. Currently, the control plane is not capable of prioritizing light paths during restoration and can simply apply some random timers to avoid restoring all light paths at the same time. The total time to restore all light paths in a network can be substantial, e.g., 10 minutes. The difference in time between the restoring the first wavelength and the last wavelength may have an impact on an SLA policy applied by the network operator. For example, if a light path fails twice on average per year, each failure can only last up to 2.5 minutes if the service must have 99.999% availability. However, if the required availability is 99.99%, then the light path can survive two 25 minute outages and still meet its SLA.

The order of restoration of light paths is also crucial for internally used light paths that provide connectivity between core routers, since some router links will be more crucial for the recovery of the bulk of the Internet Protocol (IP) traffic, while other links will only have a marginal impact on the overall traffic. With light path priority information available at the control plane, restoration can start with the higher priority light paths and leave the lower priority light paths for restoration after the higher priority ones.

In the example of FIG. 5, a fiber carrying LPs 1-30 between nodes A and C has a fault (e.g., is cut) and a fiber carrying the LPs-1-20 between nodes D and C can no longer serve those light paths. Thus, in order to get traffic to and from node C, the alternative link between nodes B and C needs to be used. In this example, there are only 10 light paths available on the link between nodes B and C. Only 10 out of the 50 LPs lost due to the two cuts can be restored over the available link B-C. Link B-C will become congested since there are only 10 light paths available, more than the number of light paths that need to be restored.

LPs 1-4 used between nodes D and C are high priority light paths, e.g., Priority 1 light paths. Similarly, LPs 5-10 between nodes A and C are Priority 1 light paths. In this scenario, only LPs 1-4 from link D-C and LPs 5-10 from link A-C are redirected over link B-C. All nodes in the network will know about the light path priority information and will take action respecting this light path priority information, e.g., first redirecting higher priority wavelengths. In this example scenario, all of the higher priority light paths would be redirected and would go through. Moreover, when a fiber is repaired on links D-C and/or A-C, the higher priority light paths are sent over the repaired link before the lower priority light paths.

With the ability to prioritize light paths, the control plane will be able to comply with SLAs so that a time-to-restoration constraint can be satisfied directly at control plane level. The control plane can make use of this priority information in different ways depending on operational choices. The priority information can drive either a local restoration decision, a network-wide restoration decision, or path computation element (PCE) orchestrated operations.

Figure 6:
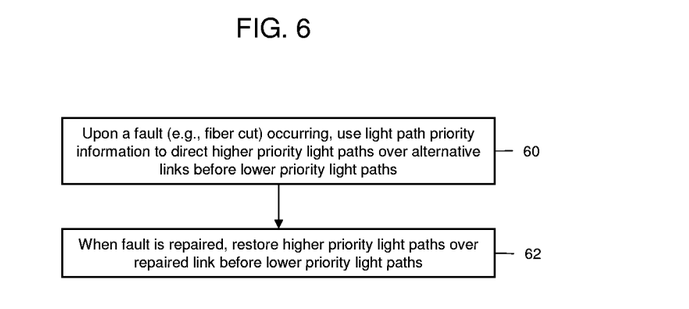
FIG. 6 illustrates a flow chart that depicts operations performed in a node for the restoration scenario depicted in FIG. 5.

FIG. 6 illustrates a flow chart that depicts the operations performed in a node for the restoration scenario depicted in FIG. 5. At 60, upon a fault (e.g., fiber cut) occurring, the node uses wavelength priority information to direct higher priority light paths over an alternative link before directing lower priority light paths over the alternative link or links. If bandwidth remains on the alternative links after the higher priority light paths are routed over the alternative link then the lower priority light paths can be routed over the alternative link. At 62, when the fault is repaired, the higher priority light paths are restored over the repaired link before the lower priority light paths.

Resource Contention

Figure 7:
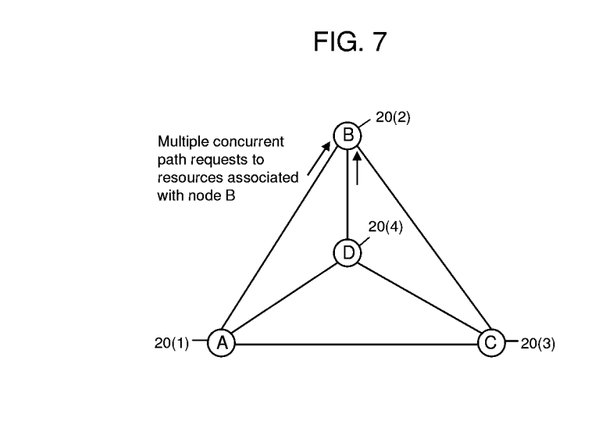
FIG. 7 is a block diagram showing an example of an optical network in which contention for a resource associated with a node is resolved using light path priority of service information.

FIG. 7 shows another scenario in which there is contention for access to a resource. For example, multiple different concurrent path requests are made to allocate the same resource that involves a particular optical node, e.g., node B in this example. The resource may be associated with regeneration pools, cross-connections, interfaces, etc. Current techniques allow only for a first-come first-serve policy for resolving resource contention or a pre-planned traffic policy where only pre-planned traffic can be installed in the network so that resource contention is resolved off-line. However, using the light path priority information made available at the control plane, the resource contention during light path setup can be resolved according to assigned light path priority, giving access to the resource for higher priority light paths before lower priority light paths.

Figure 8:
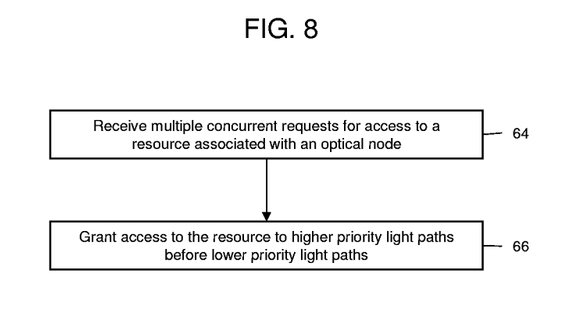
FIG. 8 illustrates a flow chart that depicts operations performed in a node for the resource contention scenario shown in FIG. 8.

FIG. 8 illustrates a flow chart that depicts the operations performed by a node for the scenario of FIG. 7. At 64, an optical node receives multiple concurrent requests for access to a resource associated with the optical node. At 66, access to the resource is granted to higher priority light paths before lower priority light paths. Again, the operations shown in FIG. 6 are useful to resolve race/contention conditions or access to scarce resources (e.g., regeneration). For example, higher priority light paths, e.g., wavelengths carrying 100 Gigabit (G) traffic, would be restored first before lower priority light paths, e.g., wavelengths carrying 10 G traffic.

Auto-Configuration

Figure 9:
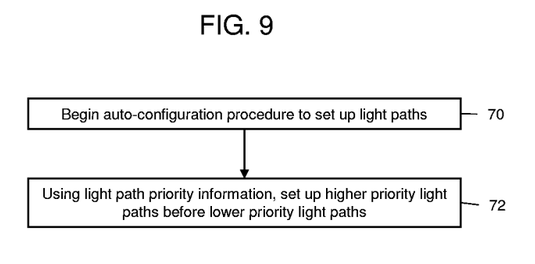
FIG. 9 illustrates a flow chart that depicts operations performed in a node during an auto-configuration procedure when setting up light paths to be served in an optical network.

Wavelength priority information can be applied during the auto-configuration process where higher priority light paths are served and set up first. Turning now to FIG. 9, use of light path priority information is shown in the auto-configuration process. At 70, a node begins the auto-configuration procedure to set up light paths for use, either for initial configuration, reconfiguration or optimization. At 72, using light path priority information, higher priority light paths are set up before lower priority light paths. In this way, higher priority light paths will be served before lower priority light paths.

Congestion Scenarios

Figure 10:
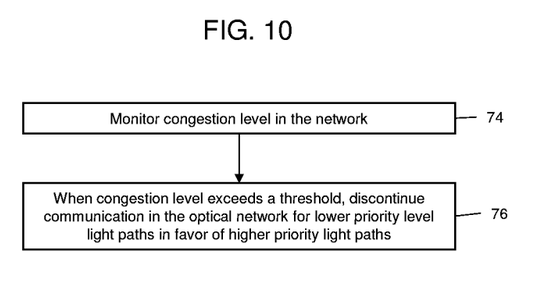
FIG. 10 illustrates a flow chart that depicts operations performed in a node using the light path priority of service information in the presence of congestion in an optical network.

FIG. 10 illustrates a flow chart that depicts operations performed in a node for congestion scenarios. At 74, a node monitors the congestion level in a network. At 76, when the congestion level (e.g., on a link served by that node) exceeds a threshold, the node discontinues service for lower priority level light paths in favor of higher priority level light paths. This is an example of a pre-emptive scenario where in a congested network lower priority light paths are in effect "kicked out" for the benefit of higher priority light paths. Similar techniques may be applied for recovery and revert scenarios, as well as "bandwidth-on-demand" scenarios.

In summary, light path priority information is added within the LSP generalized labels for GMPLS WSON extensions. This allows GMPLS to implement new policies based on light path priority. In a network optimization scenario, higher priority light paths may be allocated use of the best available fiber paths. Moreover, higher priority light paths are given the best performance parameters. SLA support may be implemented by light path priority for use in DWDM networks where light paths are tagged with different parameters. Again, the light path priority to support an SLA may be based on bandwidth (100 G, 40 G, 10 G), traffic type (Time Division Multiplexed versus IP/Ethernet or Fiber Channel payload) or network management requirements.

In summary, a method is provided comprising, at a node in an optical network, storing priority of service information for a plurality of light paths used in the optical network; and serving traffic in the optical network using the plurality of light paths based on the priority of service information.

Similarly, an apparatus (e.g., a node) is provided comprising an optical transceiver unit configured to transmit and receive optical signals in an optical network; and a controller configured to: store priority of service information for a plurality of light paths in the optical network; and serve traffic in the optical network using the plurality of light paths based on the priority of service information.

Further still, one or more computer readable storage media are provided that are encoded with software comprising computer executable instructions and when the software is executed operable to: store priority of service information for a plurality of light paths in a node of an optical network; and generate controls in the node to serve traffic in the optical network using the plurality of light paths based on the priority of service information.

The above description is intended by way of example only.

What is claimed is:

1. A method comprising:
   at a node in an optical network, storing priority of service information for a plurality of light paths used in a data plane of the optical network so that the priority of service information is available to a control plane;
   sending messages from the node over the control plane using a control plane protocol to advertise to other nodes in the optical network light path availability and the priority of service information, wherein the priority of service information indicates a plurality of priority levels for service for the plurality of light paths in the data plane such that light paths with a higher priority level are to be given higher priority to access of the optical network than light paths with a lower priority level; and
   serving traffic in the optical network using the plurality of light paths in the data plane based on the priority of service information available to the control plane, wherein the serving traffic includes:
     receiving multiple concurrent requests for access to a light path resource associated with the node;
     granting access to the light path resource for higher priority light paths before lower priority light paths; and
     at the node, upon a fault occurring in the optical network that affects one or more of the plurality of light paths:
       directing higher priority light paths over an alternative link in the optical network;
       after the higher priority light paths have been directed over the alternative link, if bandwidth is still available thereon, directing the lower priority light paths over the alternative link while the higher priority light paths remain on the alternative link; and
       restoring the higher priority light paths before the lower priority light paths over a repaired link.

2. The method of claim 1, and further comprising monitoring congestion level in the optical network, and when the congestion level exceeds a threshold, discontinuing service for lower priority light paths in favor of higher priority light paths.

3. The method of claim 1, wherein serving comprises performing an auto-configuration procedure including initially setting up and serving higher priority light paths before lower priority light paths based on the priority of service information available to the control plane.

4. An apparatus comprising:
   an optical transceiver unit configured to transmit and receive optical signals in an optical network; and
   a controller configured to:
     store priority of service information for a plurality of light paths in a data plane in the optical network so that the priority of service information is available to a control plane;
     send messages over the control plane using a control plane protocol to advertise to other nodes in the optical network light paths availability and priority of service information, wherein the priority of service information indicates a plurality of priority levels for service for the plurality of light paths in the data plane such that light paths with a higher priority level are to be given higher priority to access of the optical network than light paths with a lower priority level;

serve traffic in the optical network using the plurality of light paths in the data plane based on the priority of service information available to the control plane;

receive multiple concurrent requests for access to a light path resource associated with the node;

grant access to the light path resource for higher priority light paths before lower priority light paths; and upon a fault occurring in the optical network that affects one or more of the plurality of light paths:
- direct higher priority light paths over an alternative link in the optical network;
- after the higher priority light paths have been directed over the alternative link, if bandwidth is still available thereon, direct the lower priority light paths over the alternative link while the higher priority light paths remain on the alternative link; and
- restore the higher priority light paths before the lower priority light paths over a repaired link.

5. The apparatus of claim 4, wherein the controller is configured to monitor congestion level in the optical network, and when the congestion level exceeds a threshold, discontinue service for lower priority light paths in favor of higher priority light paths.

6. The apparatus of claim 4, wherein the controller is configured to implement an auto-configuration procedure to initially set up and serve higher priority light paths before lower priority light paths based on the priority of service information available to the control plane.

7. A computer program product, comprising:
one or more non-transitory computer readable storage media encoded with computer executable instructions that, when executed, cause a processor to:
store priority of service information for a plurality of light paths in a data plane in a node of an optical network so that the priority of service information is available to a control plane;
send messages from the node over the control plane using a control plane protocol to advertise to other nodes in the optical network light path availability and the priority of service information, wherein the priority of service information indicates a plurality of priority levels for service for the plurality of light paths in the data plane such that light paths with a higher priority level are to be given higher priority to access of the optical network than light paths with a lower priority level;

generate controls in the node to serve traffic in the optical network using the plurality of light paths in the data plane based on the priority of service information available to the control plane;

receive multiple concurrent requests for access to a light path resource associated with the node;

grant access to the light path resource for higher priority light paths before lower priority light paths; and upon a fault occurring in the optical network that affects one or more of the plurality of light paths:
- direct higher priority light paths over an alternative link in the optical network;
- after the higher priority light paths have been directed over the alternative link, if bandwidth is still available thereon, direct the lower priority light paths over the alternative link while the higher priority light paths remain on the alternative link; and
- restore the higher priority light paths before the lower priority light paths over a repaired link.

8. The computer program product of claim 7, wherein the instructions further comprise instructions that cause the processor to monitor congestion level in the optical network, and when the congestion level exceeds a threshold, discontinue service for lower priority light paths in favor of higher priority light paths.

9. The computer program product of claim 7, wherein the instructions further comprise instructions that cause the processor to implement an auto-configuration procedure to initially set up and serve higher priority light paths before lower priority light paths based on the priority of service information available to the control plane.

* * * * *